United States Patent
Pappas

(10) Patent No.: US 10,313,405 B2
(45) Date of Patent: Jun. 4, 2019

(54) DYNAMICALLY CONFIGURED CONFERENCING

(71) Applicant: Cloud9 Technologies, LLC, New York, NY (US)

(72) Inventor: Andrew Pappas, Hicksville, NY (US)

(73) Assignee: Cloud9 Technologies, LLC, New York, NY (US)

(*) Notice: Subject to any disclaimer, the term of this patent is extended or adjusted under 35 U.S.C. 154(b) by 186 days.

(21) Appl. No.: 15/265,832

(22) Filed: Sep. 14, 2016

(65) Prior Publication Data

US 2017/0230430 A1    Aug. 10, 2017

Related U.S. Application Data

(60) Provisional application No. 62/291,485, filed on Feb. 4, 2016.

(51) Int. Cl.
| | |
|---|---|
| H04L 12/00 | (2006.01) |
| H04L 29/06 | (2006.01) |
| H04L 29/08 | (2006.01) |
| H04N 7/15 | (2006.01) |
| H04N 7/14 | (2006.01) |

(52) U.S. Cl.
CPC ........ H04L 65/403 (2013.01); H04L 67/1044 (2013.01); H04N 7/147 (2013.01); H04N 7/15 (2013.01)

(58) Field of Classification Search
CPC . H04L 65/403; H04L 67/1044; H04L 67/104; H04L 12/1813; H04L 12/1818; H04N 7/15; H04N 7/147
USPC ............... 709/203, 204; 379/114.07, 204.01, 379/205.01, 202.01; 370/267, 260, 356
See application file for complete search history.

(56) References Cited

U.S. PATENT DOCUMENTS

| | | | | |
|---|---|---|---|---|
| 5,127,001 A * | 6/1992 | Steagall | ................ | H04Q 11/04 370/267 |
| 5,408,526 A * | 4/1995 | McFarland | ............. | H04M 3/56 379/114.07 |
| 5,590,127 A * | 12/1996 | Bales | .................. | H04L 12/1813 348/14.09 |
| 6,167,432 A * | 12/2000 | Jiang | ................... | H04L 12/1818 709/203 |
| 6,671,262 B1 * | 12/2003 | Kung | .................... | H04L 65/607 370/260 |
| 6,754,323 B1 * | 6/2004 | Chang | ................. | H04M 3/2218 379/205.01 |
| 6,816,469 B1 * | 11/2004 | Kung | .................. | H04Q 3/0016 370/260 |
| 6,978,002 B1 * | 12/2005 | Cope | ...................... | H04M 3/56 370/260 |
| 7,623,476 B2 * | 11/2009 | Ravikumar | ........... | H04L 67/104 370/260 |
| 8,260,854 B2 * | 9/2012 | Cockerton | .......... | H04L 12/1818 348/14.09 |

(Continued)

*Primary Examiner* — Frantz Coby
(74) *Attorney, Agent, or Firm* — FisherBroyles LLP; Richard M. Lehrer

(57) ABSTRACT

Systems and methods are provided for dynamic configuration of a digital conference call among customer premise equipment (CPE) such that CPEs that are determined to be located on a same local network connect via a peer-to-peer connection and CPEs that are determined to not be located on the same local network connect via a client-server connection.

18 Claims, 5 Drawing Sheets

(56) References Cited

U.S. PATENT DOCUMENTS

| | | | |
|---|---|---|---|
| 8,576,750 B1* | 11/2013 | Hecht | H04M 3/56 370/261 |
| 2004/0062210 A1* | 4/2004 | Genter | H04L 12/2856 370/260 |
| 2004/0099580 A1* | 5/2004 | Brotherston | B65H 1/06 209/583 |
| 2004/0101119 A1* | 5/2004 | Malcolm | H04M 3/56 379/202.01 |
| 2006/0075083 A1* | 4/2006 | Liu | G06F 11/2294 709/223 |
| 2006/0146737 A1* | 7/2006 | Ohrstrom Sandgren | H04M 3/56 370/261 |
| 2006/0177034 A1* | 8/2006 | Reding | H04M 3/46 379/211.02 |
| 2007/0211703 A1* | 9/2007 | Gu | H04L 12/1818 370/356 |
| 2009/0016514 A1* | 1/2009 | Miller | H04M 3/567 379/202.01 |
| 2009/0220066 A1* | 9/2009 | Shaffer | H04M 3/56 379/204.01 |
| 2010/0012432 A1* | 1/2010 | Noel | B25H 1/06 182/153 |
| 2013/0109365 A1* | 5/2013 | Buzdugan | H04W 76/40 455/416 |

* cited by examiner

DYNAMICALLY CONFIGURED CONFERENCING

CROSS REFERENCE TO RELATED APPLICATIONS

This application claims the benefit of the filing date of U.S. provisional patent application No. 62/291,485 entitled "Dynamically Configured Conferencing", which was filed on Feb. 4, 2016, by the same patentee of this application and which shares the same inventor as this application. That provisional application is hereby incorporated by reference as if fully set forth herein.

FIELD OF THE INVENTION

The technology of this application relates generally to digital network based communications, and more specifically but not exclusively to automatically configuring multiparty voice and/or video conferencing.

BACKGROUND OF THE INVENTION

Multiparty voice and/or video calls need to be conferenced together in order for all parties to hear/see each other. Conventionally, two forms of digital conferencing exist, client-server and Peer-to-Peer.

With a conventional conference server (FIG. 2), each client establishes connections with server. The server handles stream transmission to indicated clients In the event that there are a large number of participants on the conference, this may tax the resources of the conference server and possibly degrade the quality of the conference.

With conventional Peer-to-Peer conferencing (FIG. 1) each client sends their media to each other client in the conference and receives media from each other client in the conference. Thus, if there are three clients in the conference then each client is sending two streams and receiving two streams (there is no need for a client to send or receive a stream from/to itself). If there are X clients in the conference, then each client is sending X−1 streams and receiving X−1 streams. No conference server is required for Peer-to-Peer conferencing.

A conventional Hybrid Conference is defined as a combination of the above. Typically, in a hybrid conference call situation, clients will determine whether to employ peer-to-peer or client-server technology based on bandwidth availability. However, this is a reactive solution rather than a proactive solution.

It would be advantageous to provide systems and methods for configuring a conference call, which automatically selects peer-to-peer or client-server protocols based on a relative location of a client connecting to the call. It would be further advantageous to provide such systems and methods which automatically select peer-to-peer for clients on a common local network or subnetwork and client server for clients on different local networks or subnetworks.

BRIEF SUMMARY OF THE INVENTION

Many advantages will be determined and are attained by the technology of the application, which in a broad sense provides systems and methods for configuring connections to a conference call.

One or more embodiments of the technology provide(s) a system for dynamically provisioning a conference call among at least three customers. The system includes each of the customers being associated with a respective customer premise equipment (CPE). At least one of the CPEs is located within a network. That CPE has a conference call module configured to determine a location of another CPE. The module is configured to cause the CPE to connect to the another CPE via a peer-to-peer connection for the conference call when the module determines that the another CPE is located within the network. The module is also configured to cause the CPE to connect to the another CPE for the conference call via a conference server when the module determines that the another CPE is not located within the same network.

One or more embodiments of the technology provide(s) a method for dynamically configuring a digital conference call among at least three customers. The method includes a CPE associated with one of the customers determining that a CPE associated with another of the customers is located on the same network as the CPE associated with the one of the customers. The method also includes the CPE associated with the one of the customers setting up a peer-to-peer connection with the CPE associated with the other customer for participation in a conference call.

One or more embodiments of the technology provide(s) a method for dynamically configuring a digital conference call among at least three customers. The method includes a CPE associated with one customer determining that a CPE associated with another customer is located on a different network from the CPE associated with the one customer and the CPE associated with the one customers setting up a client-server connection with the CPE associated with the other customer for participation in the conference call.

The technology will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the invention, reference is made to the following description, taken in conjunction with the accompanying drawings, in which like reference characters refer to like parts throughout, and in which.

The technology will next be described in connection with certain illustrated embodiments and practices. However, it will be clear to those skilled in the art that various modifications, additions, and subtractions can be made without departing from the spirit or scope of the claims.

DETAILED DESCRIPTION OF THE INVENTION

Figure 1:
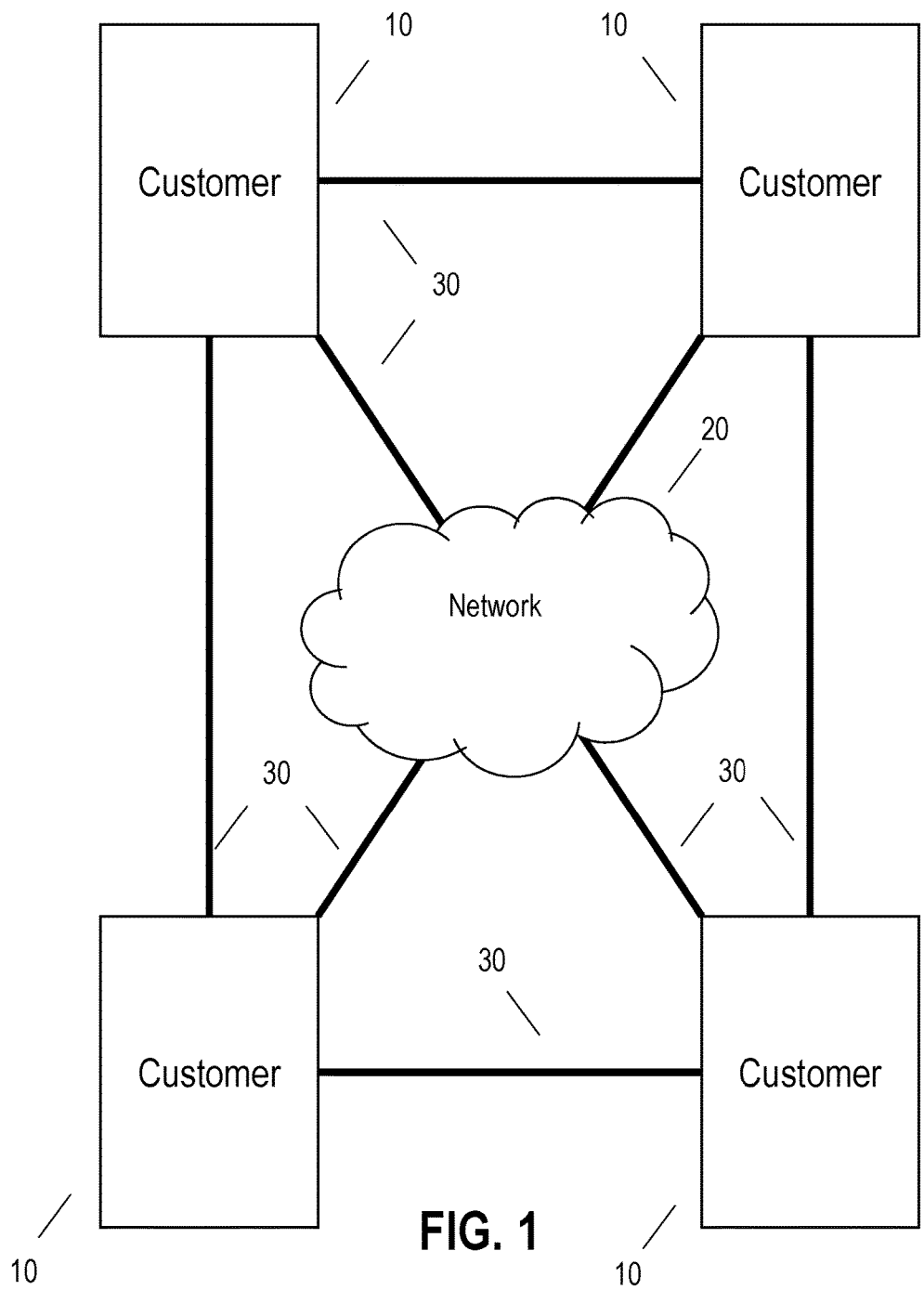
FIG. 1 provides a block diagram illustrating a prior art peer-to-peer digital conference call configuration.
Figure 2:
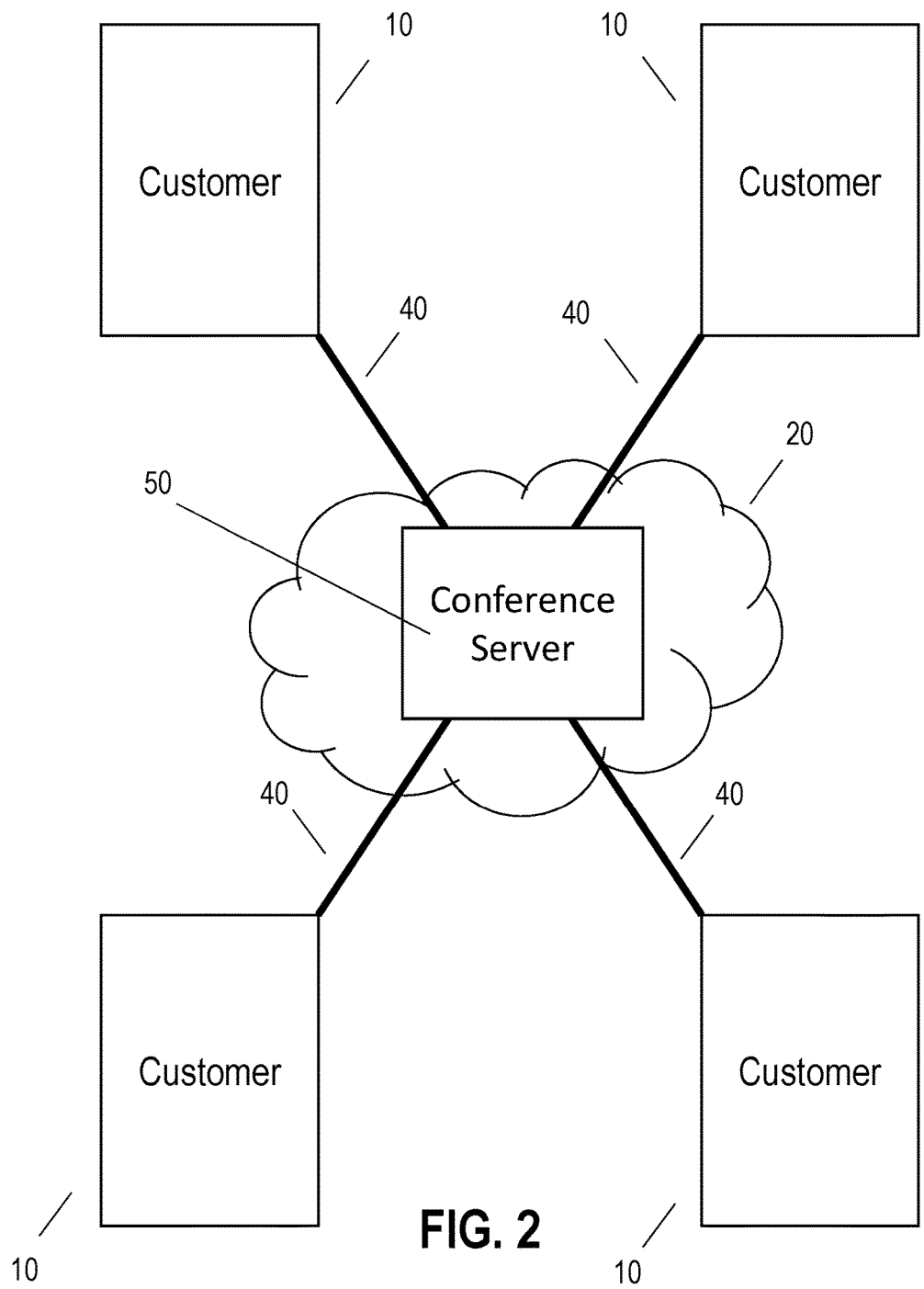
FIG. 2 provides a block diagram illustrating a prior art client-server digital conference call configuration.
Figure 3:
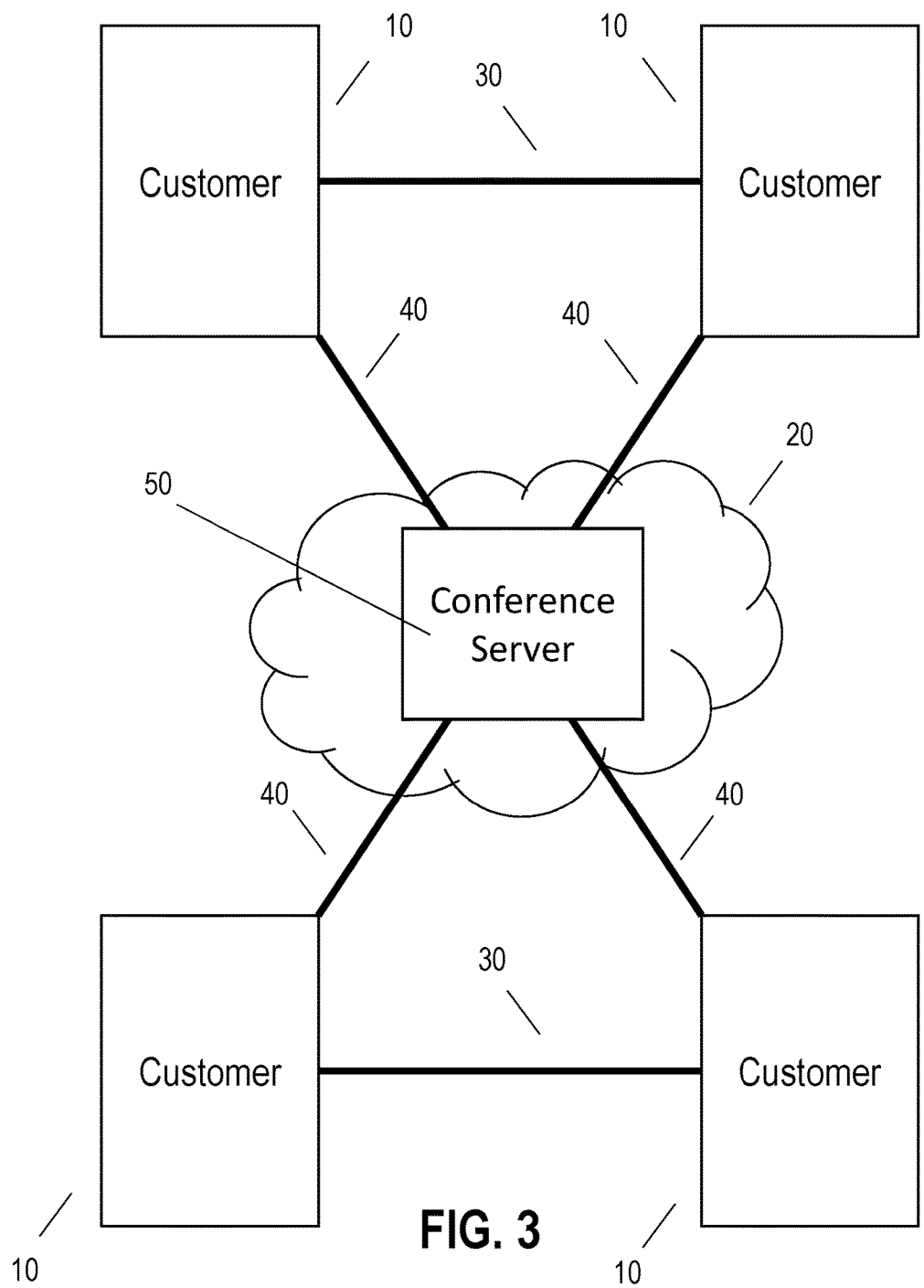
FIG. 3 provides a block diagram illustrating an exemplary hybrid conference call configuration in accordance with one or more aspects of the described technology.
Figure 4:
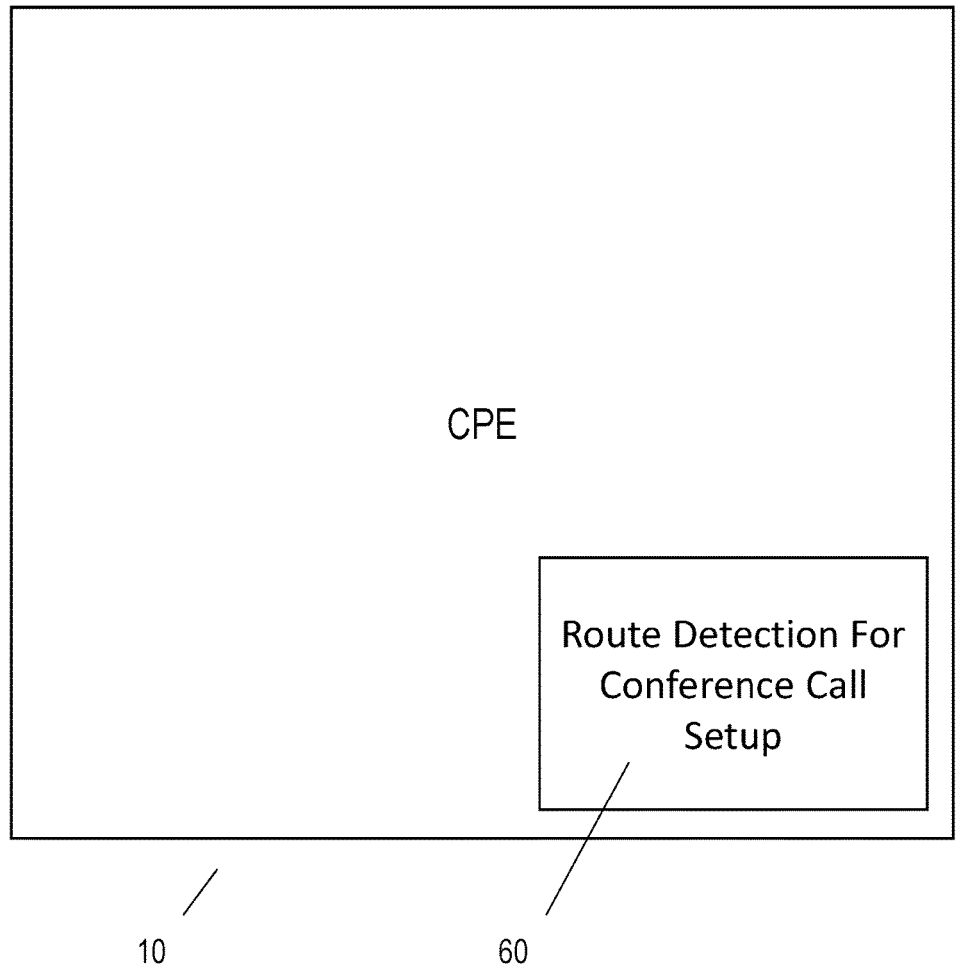
FIG. 4 provides a block diagram illustrating an exemplary client side equipment in accordance with one or more aspects of the described technology; and, FIG. 5 provides a flow chart illustrating an exemplary method for configuring a conference call in accordance with one or more aspects of the described technology.
Figure 5:
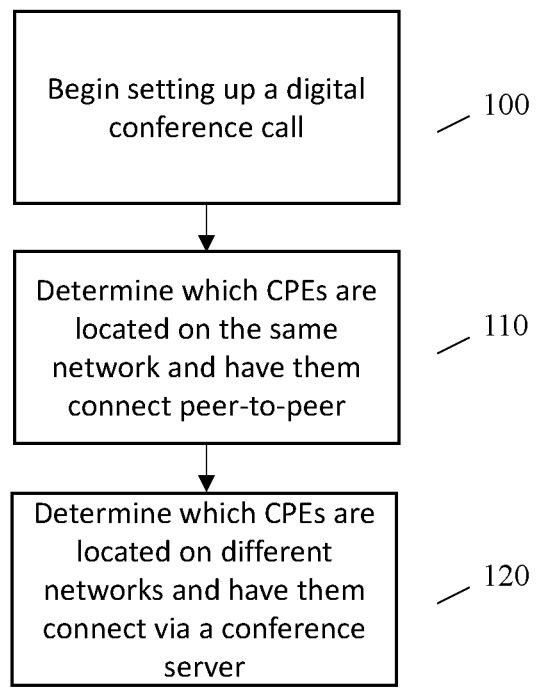

Referring to the figures in detail wherein like reference numerals identify like elements throughout the various figures, there is illustrated in FIGS. 3-5 systems and methods for automatically configuring a conference call. The following description will be limited to call logging information related to communications between/among customer premise equipment (CPE) (e.g. a computer running a voice over Internet protocol (VoIP) communication application, a VoIP audio and/or video phone, and/or any other equipment capable of transmitting and receiving audio and/or video over a digital network) and/or one or more conference servers. For ease of description, the following disclosure will be limited to four CPEs and a single conference server. However, those skilled in the art will recognize that the technology is not so limited. The technology may be available for as few as three CPEs and many more than four CPEs and there may be multiple conference servers as well. Additionally, the following description will be limited to the financial industry. However, those skilled in the art will recognize that the systems and methods could be employed by other services and other industries as well.

The following description is provided as an enabling teaching as it is best, currently known. To this end, those skilled in the relevant art will recognize and appreciate that many changes can be made to the various aspects described herein, while still obtaining the beneficial results of the technology disclosed. It will also be apparent that some of the desired benefits can be obtained by selecting some of the features while not utilizing others. Accordingly, those with ordinary skill in the art will recognize that many modifications and adaptations are possible, and may even be desirable in certain circumstances, and are a part of the technology described. Thus, the following description is provided as illustrative of the principles of the technology and not in limitation thereof.

Discussion of an embodiment, one or more embodiments, an aspect, one or more aspects, a feature, one or more features, or a configuration or one or more configurations is intended to be inclusive of both the singular and the plural depending upon which provides the broadest scope without running afoul of the existing art and any such statement is in no way intended to be limiting in nature. Technology described in relation to one or more of these terms is not necessarily limited to use in that particular embodiment, aspect, feature or configuration and may be employed with other embodiments, aspects, features and/or configurations where appropriate.

While not illustrated, each device in the system (CPE, conference server) will include, among others, common elements. These are conventional elements and thus their operation and interconnections will not be further discussed herein. Those or ordinary skill in the art are deemed to understand how elements such as a processor, memory, storage, input/output ("I/O") interface, communications interface and clock are electrically connected and how they send and/or receive messages via a bus. While these elements are not illustrated in the block diagrams, those skilled in the art will recognize that the CPE and conference server each includes, among others, these elements and that the interaction between two or more of these elements is required to perform the functions of the disclosed technology.

FIG. 3 illustrates an exemplary architecture of a system configuration for employing the technology of the application. As illustrated, the system includes CPEs 10, a wide area network 20 such as the Internet (or some other Internet Protocol and/or Frame Relay network) and a conference server 50. While four CPEs 10 and one conference server 50 are presented, those skilled in the art will recognize that this is done strictly for ease of description and that the technology is not so limited. The number of servers 50 and CPEs 10 is likely to be a lot larger than illustrated but can also be as few as three CPEs 10.

Techniques for setting up a peer-to-peer 30 or client-server 40 connection for a conference call are well known to those skilled in the art and thus will not be described further herein.

As illustrated in FIG. 4, each CPE 10 includes a route detection for conference call setup module 60. This module 60 may be realized in software, hardware, firmware or a combination thereof. When a CPE 10 attempts to begin a conference call (100, FIG. 5), the module 60 will detect, based at least in part on the address, or other identifying information of the other intended participants of the conference, whether or not each participant is located on the same network or subnetwork (depending on the design choices of the system) as the CPE 10 (110, 120 FIG. 5). For each participant which is located on the same network or subnetwork the module 60 will cause the CPE 10 to set up a peer-to-peer 30 connection with that/those participants (120, FIG. 5) and for each participant for which the customer is not a member of the same network or subnetwork, the module will cause the CPE 10 to set up a client-server 40 connection with that/those participants (140, FIG. 5). This will reduce delay between local CPEs 10, which will in turn reduce echo and it will also reduce the resource allocation on the network 20 and on the server 50.

In one or more configurations, the conference server 50 may determine which, if any, participants to a conference call are attempting to join from the same network and send a message to those customers instructing them to connect as peer-to-peer 30 with each other. As with the determination by the CPE, the determination by the conference server will be based at least in part on the address, or other identifying information of the intended participants of the conference call. Upon receipt of the message, the CPE(s) 10 in question will connect as peer-to-peer 30 and stop communicating with the conference server 50 for that conference. The conference server 50 may determine this information from the IP address, from some other address or it may require customers to provide information about their networks when logging into the server 50. This configuration may be used in conjunction with the previously described configuration or instead of the previously described configuration and still fall within a scope of one or more of the below claims.

While the above description has been limited to hybrid conference calls, the technology is not so limited. In the event that all CPEs 10 are determined to be located on the same local network the technology will cause the entire conference call to be configured as a peer-to-peer 30 conference call and in the event that all CPEs 10 are determined to be located on different local networks the entire conference call will be configured as a client-server 40 conference call.

Additionally, even if all CPEs 10 are determined to be located on the same network 20 or all CPEs 10 are determined to be located on different networks 20 the conference call may still be configured as a hybrid conference call. In an effort to maintain a high quality of the conference call, the server 50 and/or CPE 10 (depending on system the configuration) may be configured to modify the call configuration based on CPE priority, or message latency such that servers could connect to each other as peer-to-peer like CPEs, so connections would be routed from server to server. Connection hybrid types may include one or more of CPE-CPE, CPE-Server, and/or Server-Server. By way of a non-limiting, non-exhaustive example, if there are a large number of CPE's 10 attempting to connect to a conference call, even though all of the CPE's 10 are located within the same network 20 or all of the CPEs are located within different networks, the system may be configured to connect some CPEs 10 as peer-to-peer 30, some CPEs 10 will connect through a first conference server 50, some CPE's will connect through another conference server 50 and the two conference servers may connect to each other. Those skilled in the art will recognize that these numbers are strictly for descriptive purposes and are not intended to be limiting. The rules for modifying the call configuration could be different for CPEs 10 on the same network versus CPEs 10 on different networks. Additionally, the rules may be different based on network

Having thus described preferred embodiments of the technology, advantages can be appreciated. Variations from the described embodiments exist without departing from the scope of the technology. Thus it is seen that systems and methods are provided for dynamically provisioning conference call protocols based on network locations of conference participants relative to one another. Although particular embodiments have been disclosed herein in detail, this has been done for purposes of illustration only, and is not intended to be limiting with respect to the scope of the claims, which follow. In particular, it is contemplated by the inventors that various substitutions, alterations, and modifications may be made without departing from the spirit and scope of the technology as defined by the claims. Other aspects, advantages, and modifications are considered to be within the scope of the following claims. The claims presented are representative of the technology disclosed herein. Other, unclaimed technology is also contemplated. The inventors reserve the right to pursue such technology in later claims.

Insofar as embodiments of the technology described above are implemented, at least in part, using a computer system, it will be appreciated that a computer program for implementing at least part of the described methods and/or the described systems is envisaged as an aspect of the invention. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. A dynamically provisioning conference call system for a conference call among at least three customers, said system comprising:
   a conference server;
   each of said customers associated with a respective customer premise equipment (CPE); at least one of said at least three CPEs being located within a network; said at least one CPE having a conference call module that determines a location of at least two others of said at least three CPEs;
   said conference call module causing said at least one CPE to connect to one of said at least two others of said CPEs via a peer-to-peer connection for said conference call when said conference call module determines that said one of said at least two others of said CPEs is located within the network; and,
   said conference call module causing said at least one CPE to connect to another of said at least two others of said CPEs for said conference call through the conference server when said conference call module determines that said another of said at least two others of said CPEs is not located within the network.

2. The system according to claim 1 further comprising: said conference server having a server conference call module; wherein said server conference call module instructs yet another of said at least three CPEs to connect with said at least one CPE for said conference call via a peer-to-peer connection when said server conference call module determines that said yet another CPE is located within the network; and,
   wherein said server conference call module instructs said yet another CPE to connect with said at least one CPE for said conference call through the server when said server conference call module determines that said yet another CPE is not located within the network.

3. The system according to claim 1 wherein said at least one CPE includes a priority; and, wherein said conference call module causes said at least one CPE to connect to yet another of said at least three CPEs for the conference call through the conference server when said conference call module determines that said yet another CPE is located within the network and that said priority allows such a connection.

4. The system according to claim 1 further including said conference server having a server conference call module and yet another of said at least three CPEs involved in the conference call has a priority associated therewith; and, wherein said server conference call module causes said yet another of said at least three CPEs to connect to said at least one CPE for the conference call via a peer to peer connection when said server conference call module determines that said yet another CPE is not located within the network and that said priority allows such a connection.

5. The system according to claim 1 wherein each of said at least three CPEs has an Internet Protocol (IP) address and wherein said conference call module is configured to determine a network location of said at least one CPE based at least in part on said IP address of said at least one CPE.

6. The system according to claim 5 wherein said conference call module is configured to determine a network location of said one of said at least two others of said CPEs based at least in part on said IP address of said one of said at least two others of said CPEs and based on said network location of said one of said at least two others of said CPEs determine if said one of said at least two others of said CPEs is located within said network.

7. The system according to claim 1 wherein said CPE associated with each of said customers includes video conferencing equipment.

8. The system according to claim 1 wherein said CPE associated with each of said customers includes a voice over Internet Protocol (VoIP) phone.

9. A method for a customer premise equipment to dynamically configuring a digital conference call among at least three customers, said method comprising:
- a customer premise equipment (CPE) associated with one of said customers determining that a CPE associated with another of said customers is located on a same network as said CPE associated with said one of said customers;
- said CPE associated with said one of said customers setting up a peer-to-peer connection with said CPE associated with said another of said customers for participation in a conference call;
- said CPE associated with said one of said customers determining that a CPE associated with yet another of said customers is located on a different network from said CPE associated with said one of said customers; and,
- said CPE associated with said one of said customers setting up a connection with said CPE associated with said yet another of said customers through a conference server for participation in said conference call.

10. The method according to claim 9 wherein said conference call is a video conference call.

11. The method according to claim 9 wherein said conference call is an audio conference call.

12. The method according to claim 9 further including said CPE associated with said one of said customers determining that a CPE associated with yet another of said customers is located on the same network as said CPE associated with said one of said customers and that said CPE associated with said yet another of said customers includes a priority associated therewith; and,
- said CPE associated with said one of said customers setting up a connection with said CPE associated with said yet another of said customers through a conference server for participation in said conference call.

13. The method according to claim 9 further including said CPE associated with said one of said customers determining that a CPE associated with yet another of said customers is located on a different network from said CPE associated with said one of said customers and that said CPE associated with said yet another of said customers includes a priority associated therewith; and,
- said CPE associated with said one of said customers setting up a connection with said CPE associated with said yet another of said customers via a peer to peer connection for participation in said conference call.

14. The method according to claim 9 wherein said CPE associated with said one of said customers determining that said CPE associated with said another of said customers is located on the same network as said CPE associated with said one of said customers based at least in part on an Internet Protocol (IP) address of said CPE associated with said one of said customers and an IP address of said CPE associated with said another of said customers.

15. The method according to claim 14 wherein said CPE associated with said one of said customers determining that said CPE associated with said another of said customers is located on the same network as said CPE associated with said one of said customers includes a conference call module located on said CPE associated with said one of said customers making said determination.

16. The method according to claim 14 wherein said CPE associated with said one of said customers determining that said CPE associated with said another of said customers is located on the same network as said CPE associated with said one of said customers includes said CPE associated with said one of said customers communicating with a conference server and said conference server making said determination and informing said CPE associated with said one of said customers of said determination.

17. The method according to claim 16 wherein said conference server includes a server conference call module that makes said determination.

18. A method for a customer premises equipment to dynamically configuring a digital conference call among at least three customers, said method comprising:
- a customer premise equipment (CPE) associated with one of said customers determining that a CPE associated with another of said customers is located on a different network from said CPE associated with said one of said customers; and,
- said CPE associated with said one of said customers setting up a client-server connection with said CPE associated with said another of said customers for participation in a conference call; and,
- said CPE associated with said one of said customers changing said connection with said another of said customers to a peer-to-peer connection for participation in said conference call in response to determining that said CPE associated with said another of said customers includes a priority associated therewith.

* * * * *